(No Model.)
C. A. HITCHCOCK.
APPARATUS FOR EXTRACTING PRECIOUS METALS FROM BLACK SAND, &c.
No. 590,524. Patented Sept. 21, 1897.
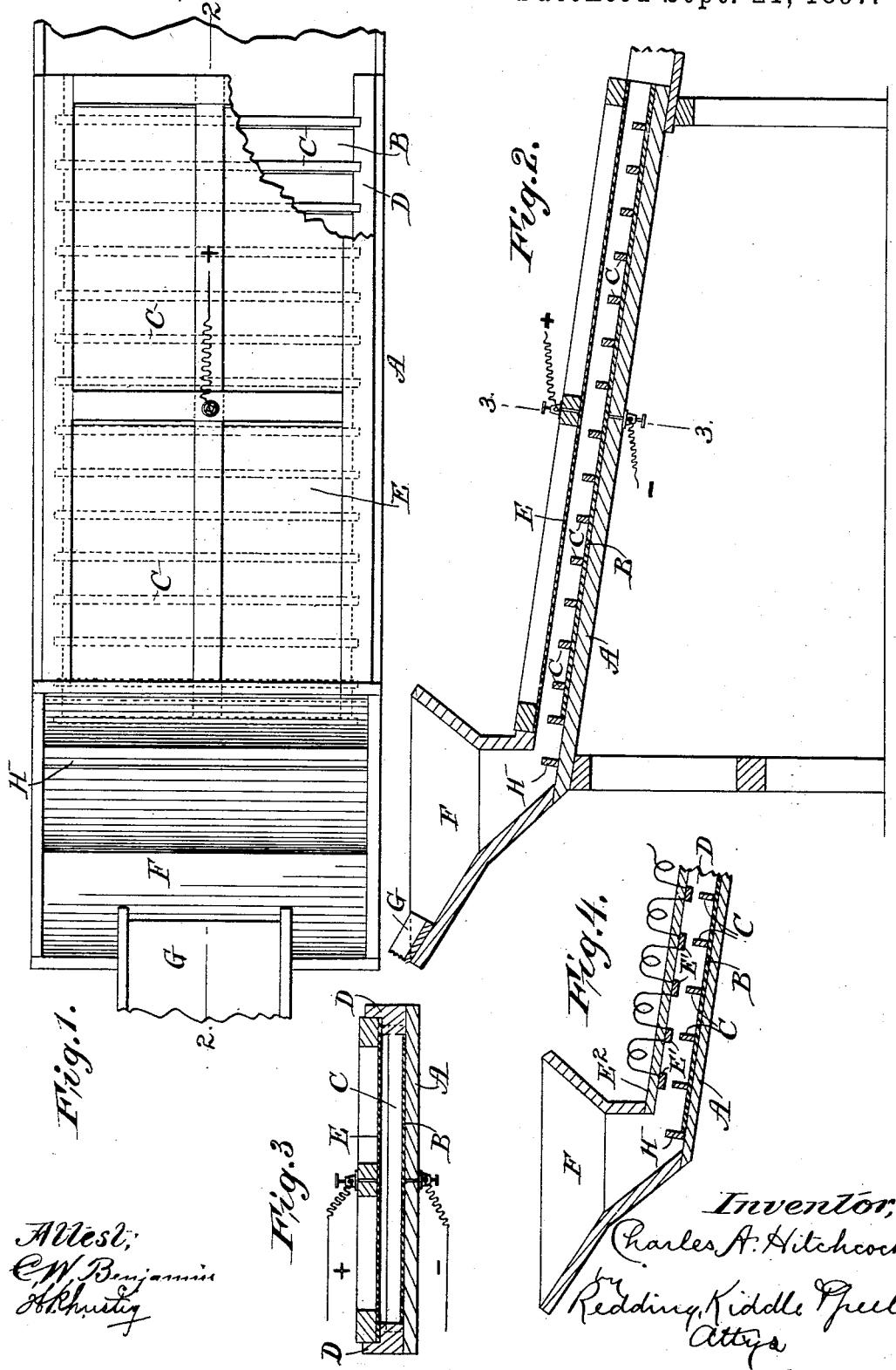

UNITED STATES PATENT OFFICE.

CHARLES A. HITCHCOCK, OF SAN FRANCISCO, CALIFORNIA.

APPARATUS FOR EXTRACTING PRECIOUS METALS FROM BLACK SAND, &c.

SPECIFICATION forming part of Letters Patent No. 590,524, dated September 21, 1897.

Application filed March 3, 1897. Serial No. 625,807. (No model.)

*To all whom it may concern:*

Be it known that I, CHARLES A. HITCHCOCK, a citizen of the United States, residing in the city of San Francisco, county of San Francisco, in the State of California, have invented certain new and useful Improvements in Apparatus for Extracting Precious Metals from Black Sand, &c., of which the following is a specification, reference being had to the accompanying drawings, forming a part hereof.

This invention relates to the extraction of gold, silver, copper, &c., and more especially to the separation of such metals from black sand, tailings, &c., which it has not been generally considered practicable to work hitherto on account of the large expense and small returns, although the invention can be applied advantageously to the working of richer material.

In accordance with my invention the black sand or the ore in a finely-divided state is passed between electrodes in the presence of water, to which a small quantity of common salt or other suitable chemical preferably has been added, the chlorin or other gas which is set free by the action of the electric current attacking and perfectly cleansing the particles of gold or other metal and removing the film of oxid which covers them and permitting them to be amalgamated upon the surface of one of the electrodes which has been prepared for that purpose. The sand or finely-divided ore and the water being thoroughly mingled, are allowed to flow in a continuous and rapid stream over a series of obstructions or stop-bars which are placed upon one of the electrodes, formed as a flat plate with a plane surface. There are thus formed a series of small cataracts, in each of which the suspended particles are made to impinge more or less directly upon the plate referred to, it being understood that the other electrode is supported at a proper distance above the under plate or electrode. The result of this action is that the particles of solid matter are not permitted to mass together, but are kept apart, suspended in the fluid medium, so that the particles of metal are much more thoroughly subjected to the action of the nascent chlorin or other gas and are much less likely to be carried through the apparatus without being subjected to such action. Furthermore, if, as is preferable, the lower plate is the negative electrode and has been previously amalgamated the particles of gold or other metal cleansed and freed from oxid in the manner described are themselves caused to impinge upon the amalgamated negative electrode and are therefore much less likely to escape amalgamation upon the surface thereof than if moved along in substantial parallelism therewith. Moreover, the obstructions or stop-bars check at intervals the flow of the water and suspended solid matter and thereby prevent the flouring and carrying away of the quicksilver and amalgam by erosion of the lower plate, which would otherwise occur, while at the same time the plate is so exposed between the stop-bars as to insure the amalgamation of all of the gold or other metal without unduly extending the plate.

The invention will be more readily understood by reference to the accompanying drawings, in which I have illustrated an apparatus with which the invention may be practiced and in which it is embodied in part.

In said drawings, Figure 1 shows such an apparatus in plan view, a part of the upper plate being broken away. Fig. 2 is a vertical longitudinal section on the line 2 2 of Fig. 1. Fig. 3 is a cross-section on the line 3 3 of Fig. 2. Fig. 4 is a partial longitudinal sectional view of a slightly-different form of the apparatus.

In the apparatus shown in the drawings a suitable frame or table A supports an insulated plate B at an inclination sufficient to occasion a rapid flow of water over it. The said plate B is preferably of copper, silvered and amalgamated in whole or in part. At intervals along the plate and resting thereon are disposed stop-bars C C, preferably of wood or other insulating material, which are supported removably in position by side bars D D, which are slotted to receive the ends of the stop-bars. The lower side of each stop-bar is inclined from the vertical toward the lower end of the plate, so as to insure the formation of an abrupt fall or cataract.

The plate B constitutes one electrode, preferably the negative, and at a suitable distance above it is supported the other or positive electrode E.

As represented in Figs. 2 and 3, the positive electrode E may consist of a single plate of iron or carbon or other suitable material, or, as indicated in Fig. 4, the positive electrode may consist of a series of bars E', of carbon or other suitable material, secured to a cover-plate E² and electrically connected with one another. In both constructions, however, a tubular or covered chute or sluice is formed, so that the material being treated cannot splash upwardly out thereof, nor can the gases generated escape as soon as formed, but they are retained for action on the material passing through the apparatus.

The electrodes are respectively connected to any suitable source of electricity and are supported one above the other in such proximity to each other that a limited but clear space is left between the under surface of the upper electrode and the tops of the stop-bars, so that the mingled water and sand or finely-divided ore as it passes over the stop-bars shall be brought in contact with the upper electrode, completing the circuit, but shall not be unduly obstructed in its flow.

The material to be treated may be supplied to the apparatus from an ordinary tom-box or hopper F, into which a stream of water is conducted through a suitable sluice G, the black sand or finely-divided ore and water being mingled in the tom-box and being delivered thence to the plate B over a distributing-plate H. After the mingled water and sand has passed over the plate B it may be delivered to an ordinary sluice-box or conduit to carry off the waste, as usual in amalgamators.

In view of the foregoing statement as to the general nature of my present improvement and the description of the construction of the apparatus herein chosen for illustration the mode of operation of the apparatus and of practicing the improved method will be readily understood without further explanation. Owing to the force and direction of the current the heavy black sand is not allowed to gather above each stop-bar, but is kept constantly stirred up and moving, while the metal separated accumulates and is amalgamated upon the plate B below each stop-bar C, the greatest accumulation being naturally at the upper portion of said plate and diminishing toward the lower end. Whenever a clean-up is desired, the upper plate or electrode is removed, the stop-bars are lifted from their sockets, and the plate beneath them is scraped in the usual way, the amalgam removed being retorted, as usual.

When it is possible and convenient, I prefer to employ salt-water or salted water, such as sea-water or water to which common salt has been added artificially, because the cleansing of the gold or other metal, or removal of the oxid preparatory to its amalgamation, is facilitated by the chlorin set free by the action of the electrical current; but it is obvious that any other water, either natural or chemically prepared, might be employed with the same general result, and that pure water may also be used, the hydrogen set free by the decomposition of the water by the electrical current also attacking the oxid and effecting the cleansing of the particles of metal.

It will be obvious that with a sufficient supply of water the material to be treated can be carried through the apparatus rapidly and in large quantities, that no power is required except for the delivery of the sand or finely-divided ore to the tom-box and for the supply of water, and that the method can be practiced successfully with the minimum amount of labor and expense, so that lower-grade sand or ores can be treated economically and to advantage.

I claim as my invention—

An amalgamator comprising an inclined table, having longitudinal side bars, an amalgamated electrode-forming plate resting on said table between the side bars, and provided on its upper face with a series of riffle-bars, an upper electrode resting on said side bars and forming a cover overlying the lower electrode through its length and spaced above its riffled bars, the said riffle-bars being adapted to cause the rapidly-descending current to splash upwardly against the upper electrode, or form a cataract, and said cover being adapted to prevent the immediate escape of the gases generated by the electric current, and connections from the electrodes to a source of electricity; substantially as described.

This specification signed and witnessed this 2d day of March, A. D. 1897.

CHARLES A. HITCHCOCK.

In presence of—
W. B. GREELEY,
T. H. THACHER.